US010872753B2

(12) United States Patent
Deford

(10) Patent No.: US 10,872,753 B2
(45) Date of Patent: Dec. 22, 2020

(54) PRECISION HIGH VOLTAGE POWER SUPPLY UTILIZING FEEDBACK THROUGH RETURN SIDE OUTPUT

(71) Applicant: Agilent Technologies, Inc., Santa Clara, CA (US)

(72) Inventor: David Deford, Santa Clara, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 19 days.

(21) Appl. No.: 16/432,474

(22) Filed: Jun. 5, 2019

(65) Prior Publication Data

US 2020/0035473 A1  Jan. 30, 2020

Related U.S. Application Data

(60) Provisional application No. 62/703,268, filed on Jul. 25, 2018.

(51) Int. Cl.
| | |
|---|---|
| *H01J 49/02* | (2006.01) |
| *H01J 49/40* | (2006.01) |
| *H02M 3/33* | (2006.01) |
| *H02M 3/335* | (2006.01) |

(52) U.S. Cl.
CPC .......... *H01J 49/022* (2013.01); *H01J 49/025* (2013.01); *H01J 49/40* (2013.01); *H02M 3/33507* (2013.01)

(58) Field of Classification Search
CPC ........ H01J 49/022; H01J 49/40; H01J 49/025; H02M 3/33507
See application file for complete search history.

(56) References Cited

U.S. PATENT DOCUMENTS

| | | | |
|---|---|---|---|
| 4,585,987 | A | 4/1986 | Prue, Jr. et al. |
| 5,489,837 | A | 2/1996 | Arakawa |
| 5,796,296 | A | 8/1998 | Krzentz |
| 8,552,406 | B2 | 10/2013 | Phaneuf et al. |

(Continued)

FOREIGN PATENT DOCUMENTS

| | | |
|---|---|---|
| CN | 104022661 B | 2/2017 |
| WO | 2013026583 A1 | 2/2013 |

OTHER PUBLICATIONS

PCT Notification of Transmittal of Search Report and Written opinion of the ISA, App. No. PCT/US2019/041271, dated Oct. 1, 2019, 11 Pages.

(Continued)

*Primary Examiner* — Nicole M Ippolito
*Assistant Examiner* — Sean M Luck
(74) *Attorney, Agent, or Firm* — Shami Messinger, PLLC

(57) ABSTRACT

In one embodiment, a high voltage power supply includes a DC voltage input, a converter for converting a DC voltage at the DC voltage input to an AC voltage, a booster for boosting the AC voltage to a boosted AC voltage, a rectifier in DC isolation from the DC voltage input, the rectifier operable to convert the boosted AC voltage to a high DC voltage at an isolated rectifier output, a high voltage DC output for outputting the high DC voltage, a voltage control input, and an error circuit coupled to the voltage control input and operable to reduce variation in the high DC voltage by driving a return side of the isolated rectifier output in response to feedback based on the high DC voltage.

20 Claims, 13 Drawing Sheets

(56) References Cited

U.S. PATENT DOCUMENTS

| | | |
|---|---|---|
| 9,252,652 B2 | 2/2016 | Gasperi |
| 2004/0051386 A1* | 3/2004 | Cho ........................ H02M 1/32 |
| | | 307/75 |
| 2008/0035842 A1 | 2/2008 | Sudakov et al. |
| 2012/0087155 A1* | 4/2012 | Tang ................... H02M 1/4241 |
| | | 363/21.02 |
| 2012/0257421 A1* | 10/2012 | Brkovic .................. H01F 27/38 |
| | | 363/21.07 |
| 2014/0307483 A1* | 10/2014 | Sigamani ............ H02M 1/4225 |
| | | 363/21.02 |
| 2016/0036246 A1* | 2/2016 | Sakai ..................... H02J 50/05 |
| | | 307/104 |

OTHER PUBLICATIONS

Sparkes, Luke, U.S. Appl. No. 62/683,685, filed Jun. 12, 2018, 21 pages.

* cited by examiner

PRECISION HIGH VOLTAGE POWER SUPPLY UTILIZING FEEDBACK THROUGH RETURN SIDE OUTPUT

CROSS-REFERENCE TO RELATED APPLICATIONS

This application claims priority from U.S. Provisional App. No. 62/703,268, filed on Jul. 25, 2018, the contents of which are incorporated herein by reference in their entirety.

TECHNICAL FIELD

The present disclosure relates generally to power supplies for use in instrumentation such as mass spectrometers.

BACKGROUND

High voltage power supplies for low power outputs typically comprise a switching means to convert a lower voltage DC source into AC, a combination of a transformer and/or inductors to boost the AC voltage to a higher value, and a network of diodes and capacitors to convert the high AC voltage back to a high DC voltage. The output voltage can be controlled by varying the switch timing or by varying the voltage or current applied to the switches, but response speed is limited by the switching period. Filter networks are needed at the supply output to reduce the ripple voltage in precision supplies, further limiting the control bandwidth and increasing the susceptibility of the supply to electrical interference, vibrations, and other disturbances.

The slow response speed of high voltage power converters to control inputs, often combined with excessive noise levels, limits the achievable precision of the output voltage. Performance may be substantially worse when the supply is installed in a typical instrument than when isolated on the workbench.

FIG. 1 depicts a conventional power supply/converter 100 in which the discrete components of the converter represent the constituent functions of the converter, rather than the exact schematic of a practical circuit. A network of switches 102 (typically transistors) converts the DC input voltage to an AC waveform, which is applied to the primary of transformer T1. Control input circuitry 104 varies the switch timing or the applied DC excitation to cause the output voltage of the transformer to vary according to the control input. A network of diodes and capacitors, shown schematically as diode D1 and capacitor C1, converts the output voltage at the transformer secondary back to DC. Although only D1 and C1 are shown for brevity, other devices are typically present to achieve the conversion to DC. When the output ripple voltage cannot be reduced easily by the capacitors represented by C1, an output filter 106, represented schematically by resistor R1 and capacitor C2, may be employed to further reduce the ripple voltage. Again although only devices R1 and C2 are shown for brevity, others may be present to achieve the filtering. Resistors R2 and R3 divide the output voltage down to a value which can be compared to a control voltage by error amplifier U1, whose output is fed back to the control input, thereby holding the high voltage output at the desired value.

The power supply configuration of FIG. 1 can be used to make a precision high voltage source for accelerating ions in a time-of-flight (TOF) mass spectrometer (MS). Other applications are in electron microscopy, or applications that require a tightly controlled output DC voltage, for example for accelerating ions or particles in a field. A TOF-MS accelerates an ion with a known charge through a precise DC voltage, imparting a known energy to the ion. The ion flies in a field-free space over a known distance L for a measured time t before impacting an ion detector. If the constant parameters and measured time are known within certain limits of error, then the mass of the ion can be determined within a comparable error by the following calculations.

$$E_k = \tfrac{1}{2}mv^2 = \tfrac{1}{2}m(L/t)^2$$

$$E_k = qV_a$$

$$\tfrac{1}{2}m(L/t)^2 = qV_a$$

$$m = 2qV_a(t/L)^2$$

where m, v, q and $E_k$ are the mass, velocity, charge, and kinetic energy of the ion, respectively, and $V_a$ is the DC accelerating voltage. Even in the presence of a disturbance, to avoid degrading the precision of a high performance TOF-MS, the accelerating voltage $V_a$ must be held constant within a range of 0.1 ppm to 10 ppm of the nominal value, depending on the frequency of the disturbance. The tightest limits apply from DC to a few Hertz, relaxing by an order of magnitude or more up to a few tens of kilohertz. Errors are still significant above this range, but their effects decrease roughly in proportion to the frequency of the voltage error.

As long as there are no external disturbances, the circuit configuration of FIG. 1 can achieve a voltage precision in the desired range for steady values of the control voltage. The passive filtering required to reduce the ripple voltage at C1 to the lower value required at the HV DC output limits the response speed of the feedback loop to changing conditions. The practical impact of the filter 106 can be appreciated by considering the actual component values that would be required for a typical design. A 10 kV supply with 100 µA load capacity and a maximum output error of 10 mV (1 ppm) might operate at 80 kHz switching frequency and have an output ripple of 5V at C1. To reduce the ripple to 10 mV would require a single-pole filter with a cutoff frequency of 160 Hz. The time constant of the filter would be 1 ms, which could be achieved with a series resistance of 1 MΩ and a shunt capacitance of 1 nF total (filter plus load and interconnect capacitances). Accounting for added phase shifts due to nondominant poles, a loop gain bandwidth of 10 Hz should be reasonable. Since the bandwidth is well below the AC power line frequency, interference from this source (including harmonic frequencies) will not be rejected by the feedback and must not be allowed to impinge on the circuitry. Similarly, the circuitry must be isolated from vibrations originating in fans, pumps, and other mechanical devices. If the voltage setting is intentionally changed, the output voltage will lag with a time constant of about 16 ms. The problems are magnified by nonlinear responses of the diodes in the rectifier circuit and dielectric absorption in the capacitors, potting materials, and interconnecting wiring.

OVERVIEW

The claimed arrangement boosts the precision, response speed, and noise performance of conventional high voltage supplies using only common, low cost components designed to operate at low voltages. The superior performance of the regulating circuitry allows the associated switching converter to have looser specifications, potentially reducing cost. Improved immunity to outside disturbances relaxes requirements on the host system to have very low electrical interference and vibration levels.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Example embodiments are described herein in the context of a high voltage power supply. The following description is illustrative only and is not intended to be in any way limiting. Other embodiments will readily suggest themselves to those of ordinary skill in the art having the benefit of this disclosure. Reference will be made in detail to implementations of the example embodiments as illustrated in the accompanying drawings. The same reference indicators will be used to the extent possible throughout the drawings and the following description to refer to the same or like items.

In the description of example embodiments that follows, references to "one embodiment", "an embodiment", "an example embodiment", "certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. The term "exemplary" when used herein means "serving as an example, instance or illustration." Any embodiment described herein as "exemplary" is not necessarily to be construed as preferred or advantageous over other embodiments.

In the interest of clarity, not all of the routine features of the implementations described herein are shown and described. It will be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 2:
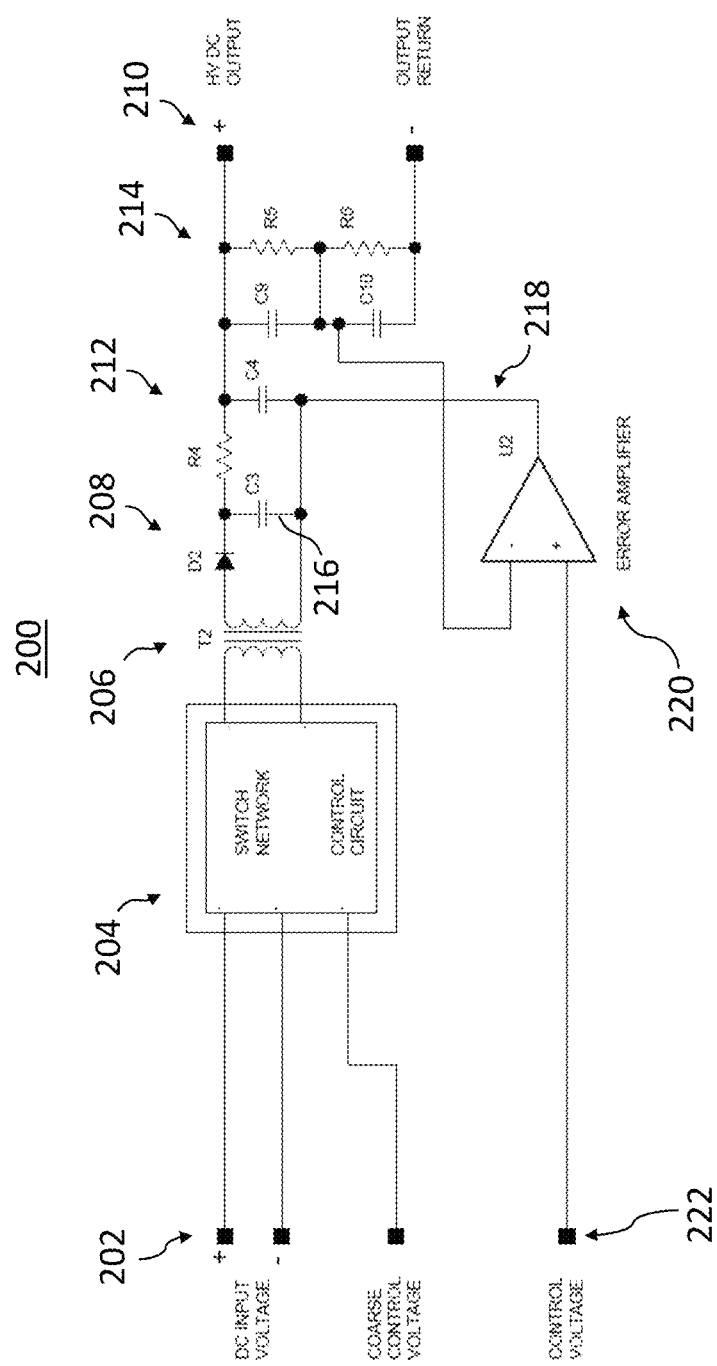
FIG. 2 is a schematic diagram of a precision high voltage power supply circuit in accordance with certain embodiments.

FIG. 2 is a schematic diagram of a precision high voltage power supply circuit 200 in accordance with certain embodiments. The circuit 200 includes a DC voltage input 202 for receiving a low DC voltage, a switching circuit 204 for converting the low DC voltage into AC, a boost circuit 206, shown in the form of a combination of a transformer and/or inductors T2, to boost the AC voltage to a higher AC voltage value, and a rectifier 208, whose output is galvanically isolated from input voltage 202, shown in the form of a network of diodes D2 and capacitors C3, to convert the high AC voltage back to a high DC voltage at DC output 210. The circuit 200 may also include an output filter 212, shown in the form of a resistor R4 and capacitor C4, to reduce ripple voltage; and a voltage divider 214, shown in the form of resistors R5 and R6.

As previously noted, in actual implementation, the recited circuit components (e.g. the DC voltage input 202, switching circuit 204, boost circuit 206, rectifier 208, HV DC output 210, output filter 212, and divider 214) may have constituent devices other than or in addition to the representative capacitors, resistors, diodes, etc. that are shown. Some of these components, for example a control portion of the switching circuit 204, may be implemented digitally or in hybrid digital and analog form. Moreover, the DC isolation between the DC input and the high voltage output provided by transformer T2 in the circuit 200 should be noted. There is no implied preference for the specific means of providing this isolation.

As shown in FIG. 2, the precision high voltage power supply circuit 200 utilizes an error circuit 220 with a feedback connection at the return side 216 of the isolated rectifier 208 output, driving that point in response to feedback from the HV DC output 210. The error circuit 220 receives as inputs a voltage control signal, at 222, and a portion of the high DC output voltage from divider 214. The voltage control signal 222 may be a voltage level, or, in digital implementations of the error circuit 220, it may be a simple digital value, as an input to a microprocessor (not shown) of the error circuit. In a hybrid digital/analog implementation of the error circuit, the voltage control signal 222 may be a pulse-width modulation (PWM) signal or the like.

Though not explicitly shown in FIG. 2, the functions that comprise the DC-to-DC converter (collectively, circuits 204, 206, and 208) may also incorporate a polarity circuit for changing the output high voltage polarity between positive and negative. As long as all configurations of the DC-to-DC converter share the same common return point 216, no changes are required in the error circuit 220. In particular, the feedback voltage sense does not need to be inverted, nor does absolute polarity of the output voltage of the error circuit 220. This remains true when the polarity reversal does not include a switching function, but instead makes a continuous transition through zero volts. By way of illustration only, one polarity circuit for changing the output high voltage polarity between positive and negative can include two separate power supplies and a high voltage switch that switches between them. The use of filtering enables the power supplies in such an arrangement to settle quickly with very little noise on each power supply. Another polarity circuit for changing the output high voltage polarity between positive and negative can include using selectable rectifier circuits, typically multipliers, that multiply in both directions, but that run off the same transformer and drive circuitry and the same feedback. Yet another polarity circuit for changing the output high voltage polarity between positive and negative can include using two power supplies in series with each other, with the two voltage multipliers for the two power supplies running off separate transformers. The polarity switching in such an arrangement is conducted on the primary side of the transformers, by selectively exciting one or the other of the transformers.

Figure 1:
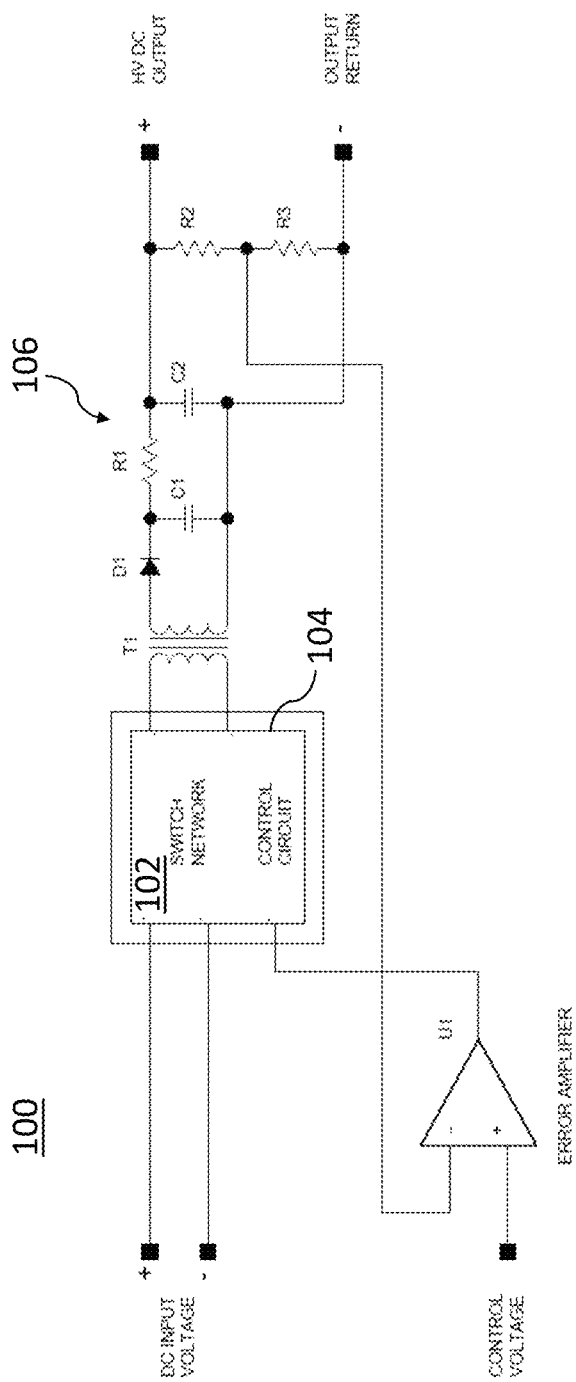
FIG. 1 depicts a conventional power supply/converter.

Many of the dynamic limitations of the prior art circuit arrangement of FIG. 1 are substantially overcome in the configuration shown in FIG. 2, with dramatic improvements in output impedance, control loop bandwidth, and rejection of spurious interferences. In particular, as seen at 218, the primary feedback path has been moved from the control input of the switching circuit 104 (FIG. 1) to the return side 216 of the rectifier's floating output. Considering the switching converter (including the switch network 204 with its control circuit, T2, D2, and C3) to be a voltage controlled voltage source, the frequency-dependent part of the feedback path from the output of error amplifier U2 to its inverting input consists of the parallel combination of R4 and C4 in series with the parallel combination of R5 and C9. The low side of the feedback network from the inverting input of the amplifier to ground is just the parallel combination of R6 and C10. The lags associated with the switching converter, the rectifier/capacitor network, and the filter are eliminated from the primary feedback path in circuit 200. Capacitors C9 and C10 have been added to the feedback divider 214 to swamp out stray capacitances that limit the frequency response of the divider, taking advantage of the high-frequency feedback path that is now available. Making the capacitance ratio of C10 to C9 substantially equal to the resistance ratio of R5 to R6 flattens the response of the divider up to frequencies well beyond the loop bandwidth. Alternatively, the time constant of R5 with C9 can be made greater than the time constant of R6 with C10, increasing the loop gain at high frequencies and further smoothing the output voltage without compromising loop stability. Three critical performance parameters are improved in proportion to the loop gain: switching frequency ripple voltage, output impedance, and rejection of injected noise and interference. The added attenuation of ripple provided by the feedback loop allows the ripple filter (represented by R4 and C4) to be much less aggressive or even eliminated entirely, further speeding up the response to intentional changes in the control voltage setting.

The benefits of the FIG. 2 arrangement described above apply as long as the output voltage of error amplifier U2 remains within its linear range. A typical amplifier having an output swing of 20 V could reduce output voltage errors to about 1 ppm over a +/−1000 ppm range for a 10 kV supply. The "Coarse Control Voltage" would need to keep the output of the switching converter within about +/−10V of the desired setting. One means of achieving this is through the use of a tracking integrator 302 shown in FIG. 3. An additional amplifier (U4) integrates the output voltage of error amplifier U3 and applies the result to the control input 304 of the switching converter 306 through a resistor R12, keeping the error amplifier output centered in its available range for slowly drifting outputs of the switching converter. Resistor R10 is tied to a voltage that is centered in the output voltage range of the error amplifier, which will not be ground when the error amplifier is powered from a unipolar power supply (not shown). The coarse control voltage input at 308 is provided through resistor R13 to bypass the integrator 302, allowing fast response to changes in the voltage setting. As in the FIG. 2 arrangement, the functions depicted in FIG. 3 may be implemented in a variety of ways, including digital as well as analog processing, or a hybrid of these.

There are many different forms of switch networks and associated control circuits, various configurations of transformers and inductors that can step up the low input voltage to a high output voltage, and many ways of rectifying and filtering circuits, including arrangements that further multiply the transformer output voltage to even higher DC levels. Similarly, filters that can reduce output ripple take various forms, and error amplifier circuits may also include analog-to-digital converters with digital processors that can drive the control input directly with digital outputs or through digital-to-analog converters. All such variations are contemplated in the described arrangement, even when a simplified circuit is shown and described as a representation of a particular function.

It might appear that the combination of the ground-referenced error circuit 220 with the high voltage circuit having isolated return 216 could reasonably be replaced by a ground-referenced high voltage circuit combined with a floating error circuit connected at the high voltage output. A similar configuration is commonly used at low voltage (below about 40V), where isolation is not required, and integrated circuit solutions are commercially available. Straightforward extensions can extend the range of this technique to several hundred volts. Practical implementations become much more complex when high precision is needed, and even worse for dual polarity outputs. When the required output voltage exceeds about 1000V, problems with voltage breakdown, leakage current, signal isolation, and power requirements become excessive, especially for high voltage supplies with low output current capability.

Figure 3:
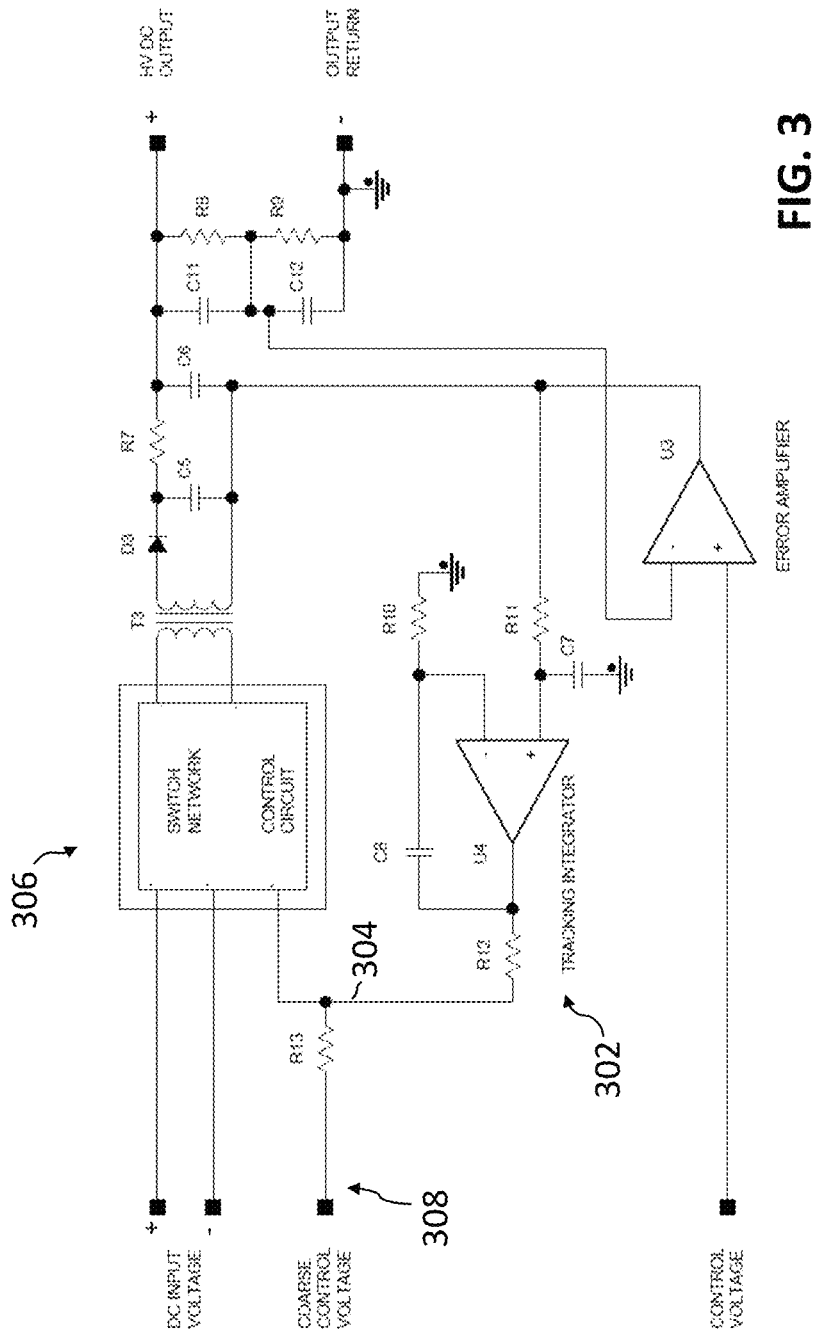
FIG. 3 is a schematic diagram of a precision high voltage power supply circuit including an integrator coupled to an output of the error circuit and to the coarse voltage input for maintaining an output of the error circuit within a prescribed range of a desired setting in accordance with certain embodiments.
Figure 4:
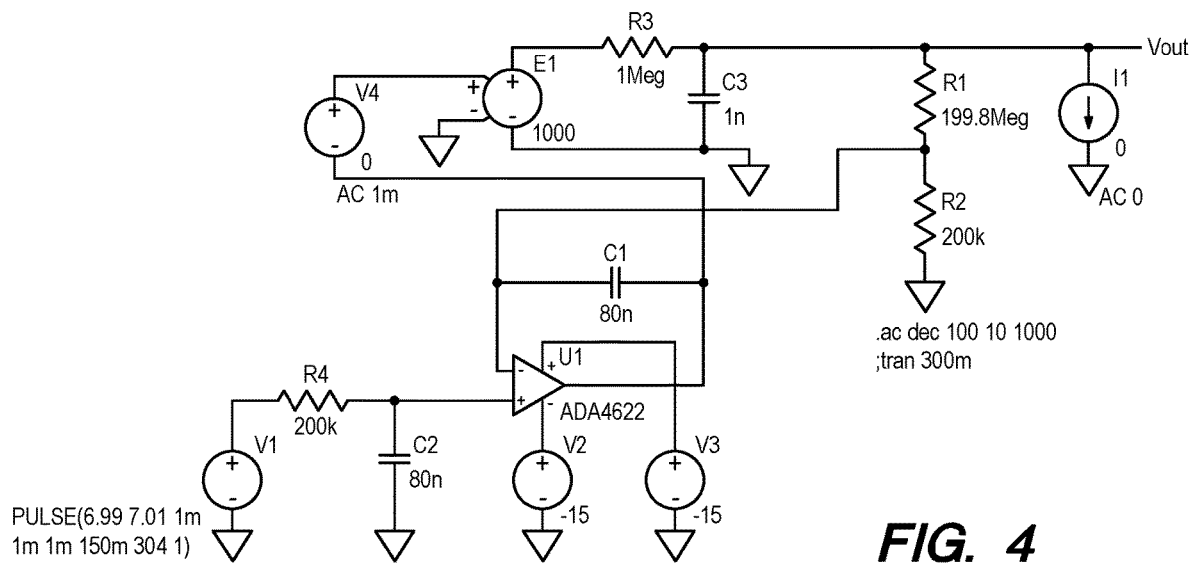
FIG. 4 is a schematic showing simulation of prior art circuit operation.
Figure 5:
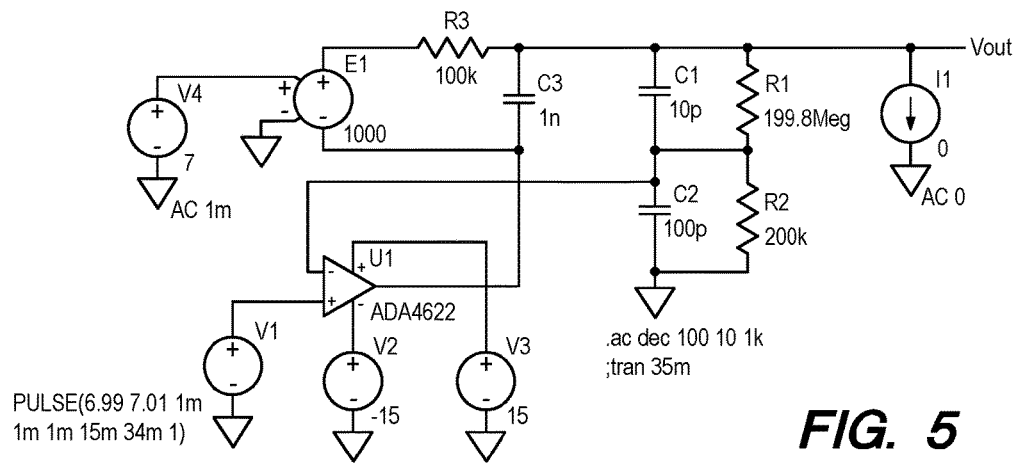
FIG. 5 is a schematic simulation of a circuit using feedback through the return side of the output as described for example in FIGS. 2 and 3.

The performance advantages of the described arrangements over the prior art are illustrated by simulating circuit operations using for example an LTSpice simulator. FIG. 4 is a schematic showing simulation of prior art circuit operation, and FIG. 5 is a schematic simulation of a circuit using feedback through the return side of the output as described for example in FIGS. 2 and 3. Although the simulation circuits in FIGS. 4 and 5 are not optimized, they demonstrate the performance that can be achieved with practical components. In the prior art simulation of FIG. 4, voltage-controlled voltage source (E1) simulates HV converter behavior at frequencies well below the switching frequency (60-100 kHz) with DC gain=1000. Voltage source V4 sets the converter operating point and sinusoidal AC error stimulus. Voltage source V1 controls the error amplifier DC setpoint and generates step transients with rise and fall times of 1 ms. Current source I1 applies sinusoidal load current variations. Ripple filter R3/C3 attenuates switching ripple (the error amplifier in the invention attenuates ripple, allowing the ripple filter in FIG. 5 to have a ten-fold higher cutoff frequency than the prior art design). Capacitors C1 and C2 in FIG. 5 take advantage of the wider bandwidth of the new design to improve speed and precision. Resistor R4 and capacitors C1 and C2 are included in FIG. 4 to counteract the overshoot caused by ripple filter R3/C3 in the prior art simulation, while maintaining a fast pulse response.

Figure 6:
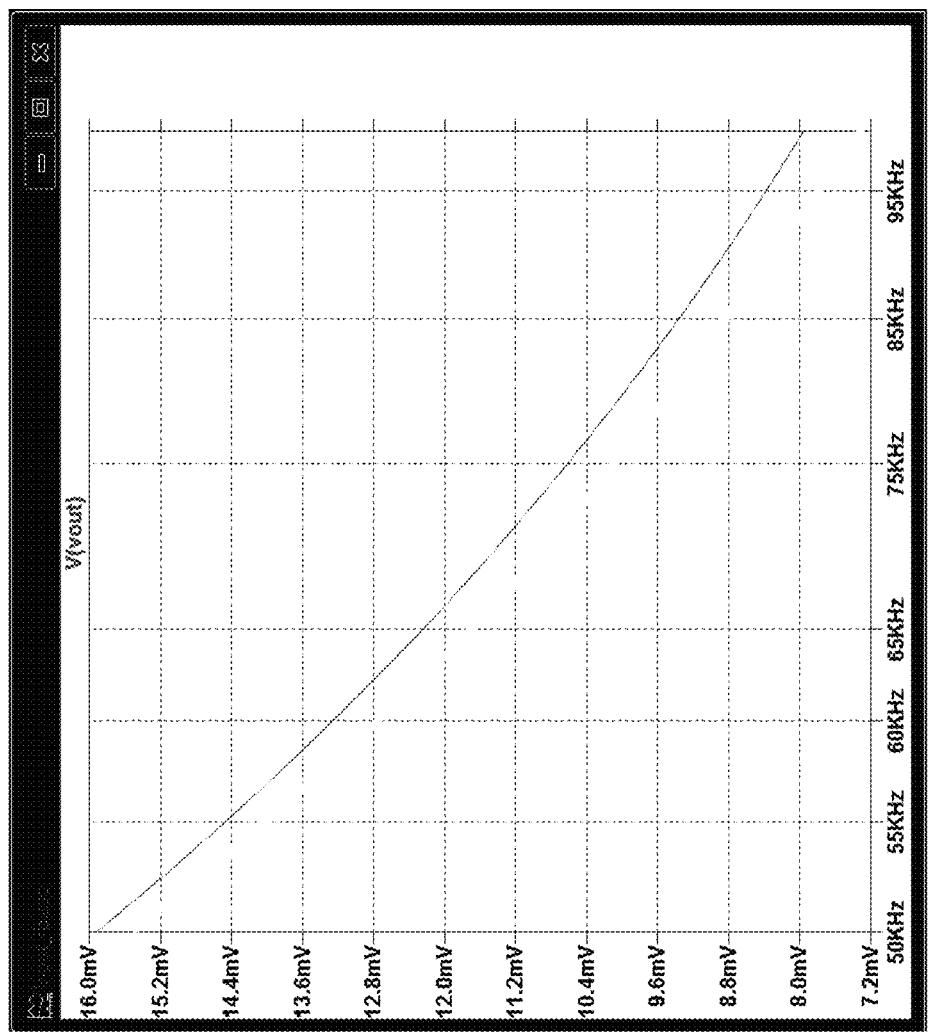
FIGS. 6 and 7 show a comparison of the output ripple voltage for 5V ripple at the switching converter output based on the simulations of FIGS. 4 and 5, respectively.
Figure 7:
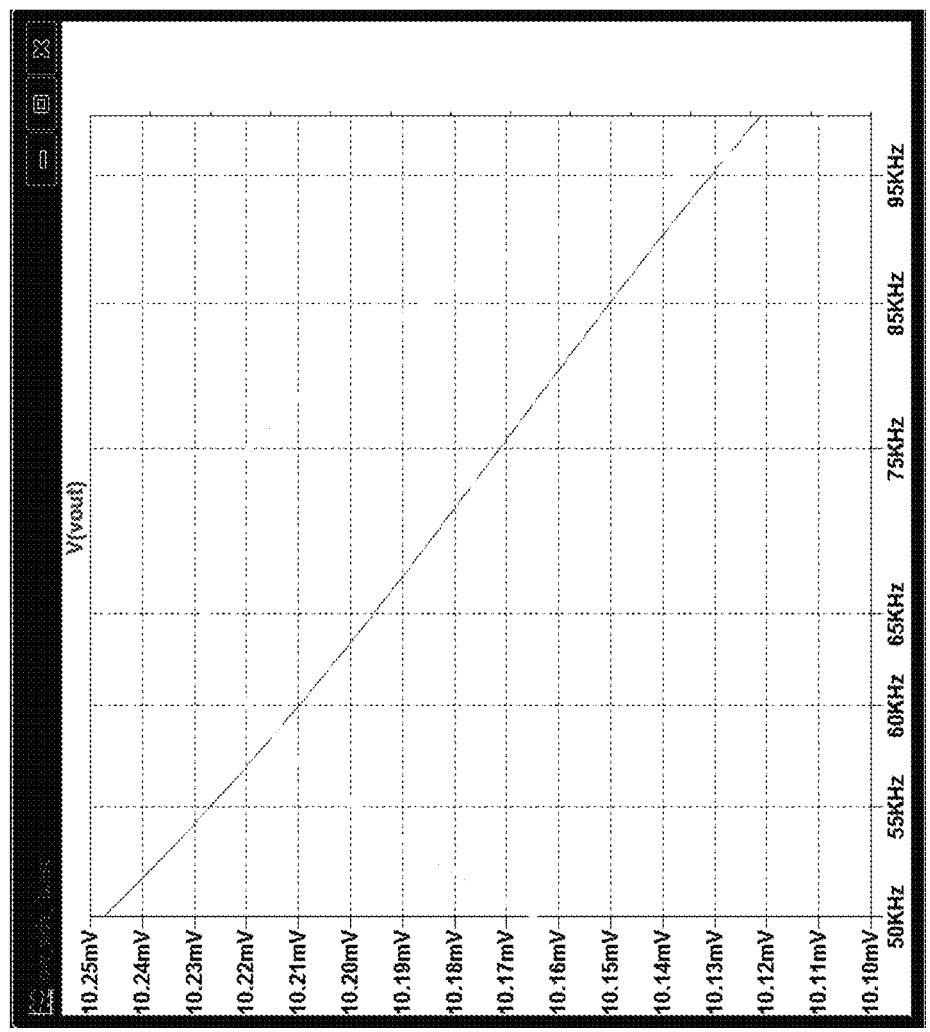

FIGS. 6 and 7 show a comparison of the output ripple voltage for 5V ripple at the switching converter output based on the simulations of FIGS. 4 and 5, respectively. FIG. 6 corresponds to the prior art simulation circuit of FIG. 4, and FIG. 7 corresponds to the simulation circuit of FIG. 5, which uses the feedback through the return side of the output in the manner of FIGS. 2 and 3. Note that the ten-fold higher ripple filter cutoff frequency in the inventive arrangement achieves similar output ripple to the prior art, which utilizes a slower filter.

Figure 8:
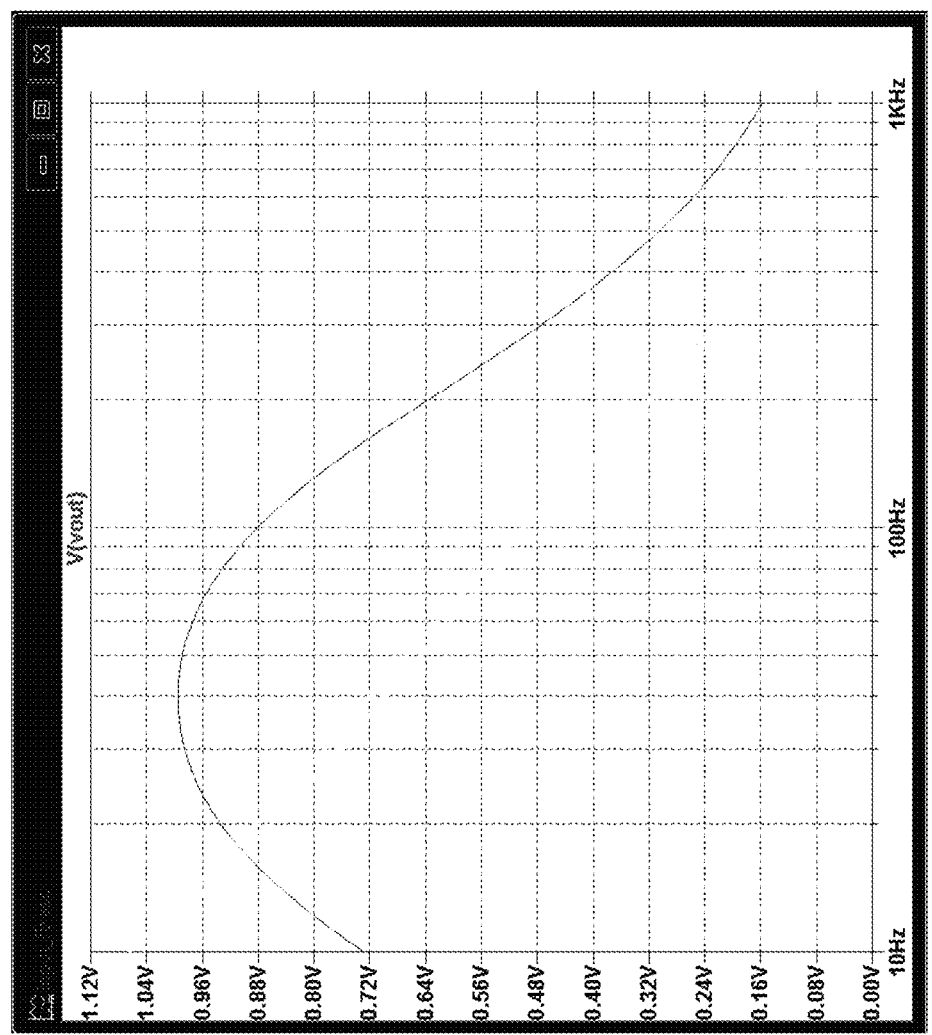
FIGS. 8 and 9 show a comparison of the output voltage response to a current of 1 µA injected into the output over the range of 10 Hz to 1000 Hz, covering AC power line frequencies and their harmonics, as well as mechanical vibrations from fans, pumps, and other moving parts.
Figure 9:
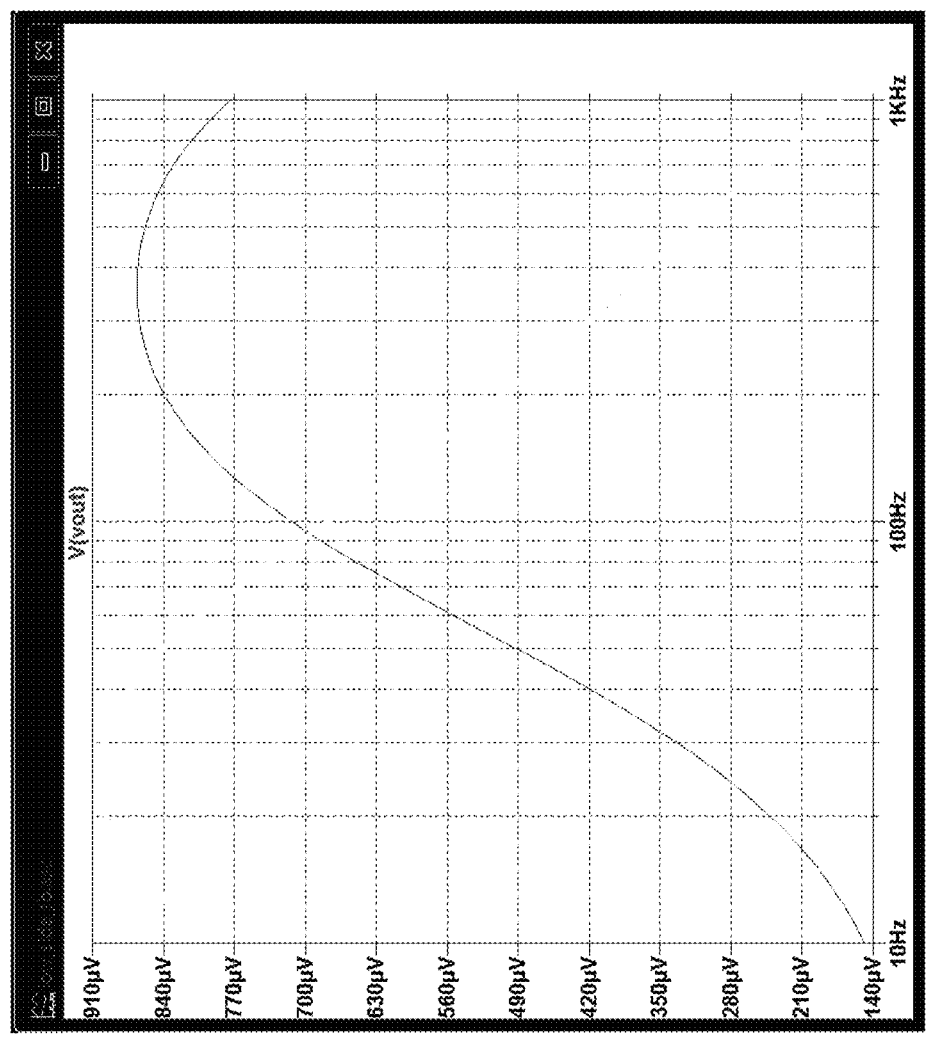

FIGS. 8 and 9 show a comparison of the output voltage response to a current of 1 μA injected into the output over the range of 10 Hz to 1000 Hz, covering AC power line frequencies and their harmonics, as well as mechanical vibrations from fans, pumps, and other moving parts. FIG. 8 corresponds to the prior art simulation circuit of FIG. 4, and FIG. 9 corresponds to the simulation circuit of FIG. 5, which uses feedback through the return side of the output in the manner of FIGS. 2 and 3. The output current stimulus is 1 microamp injected into the supply output, so the impedance in Ohms is equal to output voltage in microvolts. As can be seen from FIGS. 8 and 9, the output impedance in the arrangement using the feedback through the return side of the output in the manner of FIGS. 2 and 3 is three orders of magnitude less than the corresponding value of the prior art circuit.

Figure 10:
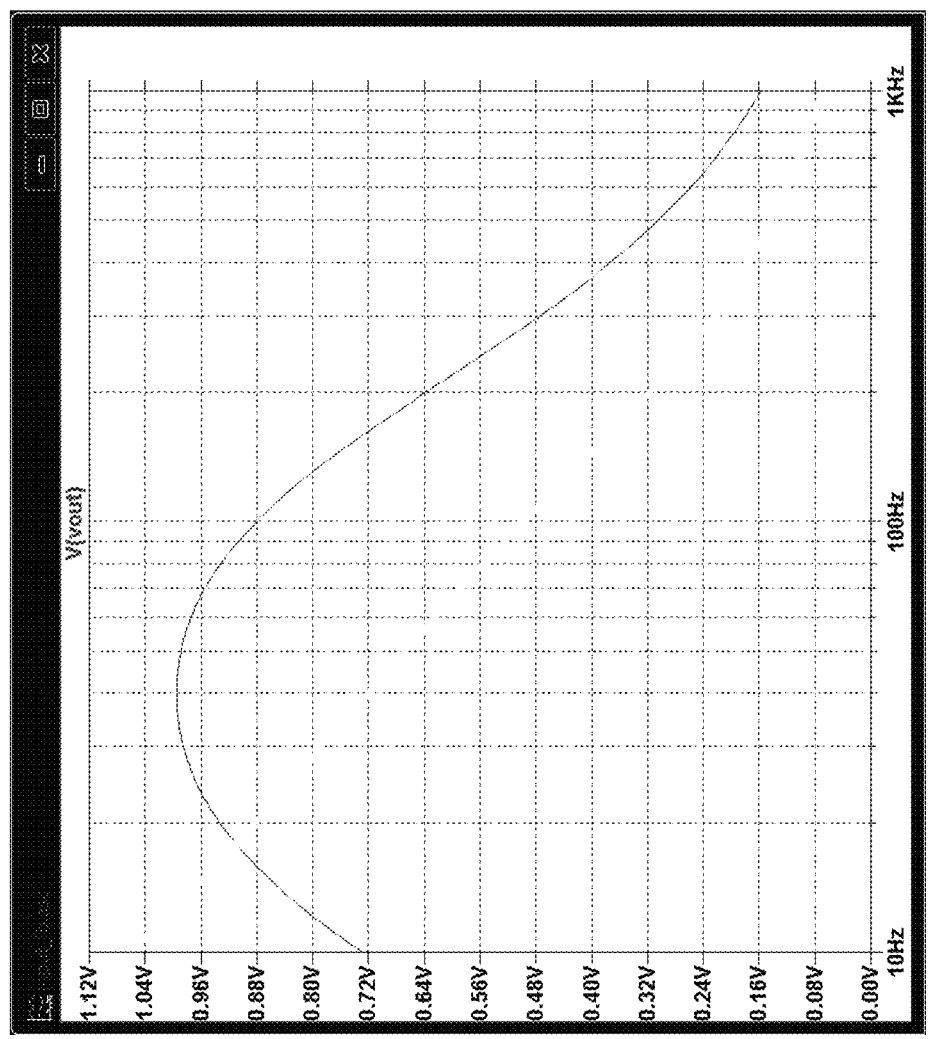
FIGS. 10 and 11 show a comparison of the output response to a 1 V interfering signal at the switching converter output over the range of 10 Hz to 1000 Hz based on the simulations of FIGS. 4 and 5, respectively.
Figure 11:
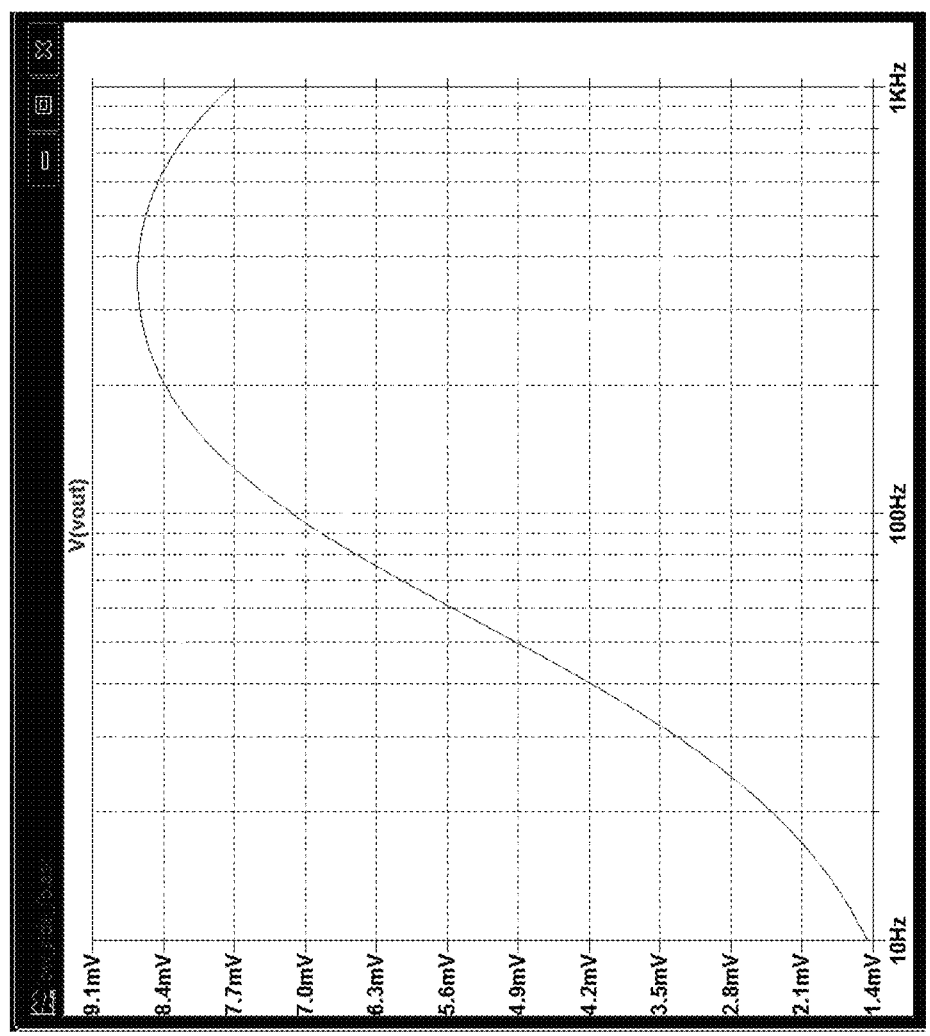

FIGS. 10 and 11 show a comparison of the output response to a 1 V interfering signal at the switching converter output over the range of 10 Hz to 1000 Hz based on the simulations of FIGS. 4 and 5, respectively. FIG. 10 corresponds to the prior art simulation circuit of FIG. 4, and FIG. 11 corresponds to the simulation circuit of FIG. 5, which uses the feedback through the return side of the output in the manner of FIGS. 2 and 3. As can be seen from FIGS. 10 and 11, the arrangement using the feedback through the return side of the output in the manner of FIGS. 2 and 3 improves on the prior art by about 100 times.

Figure 12:
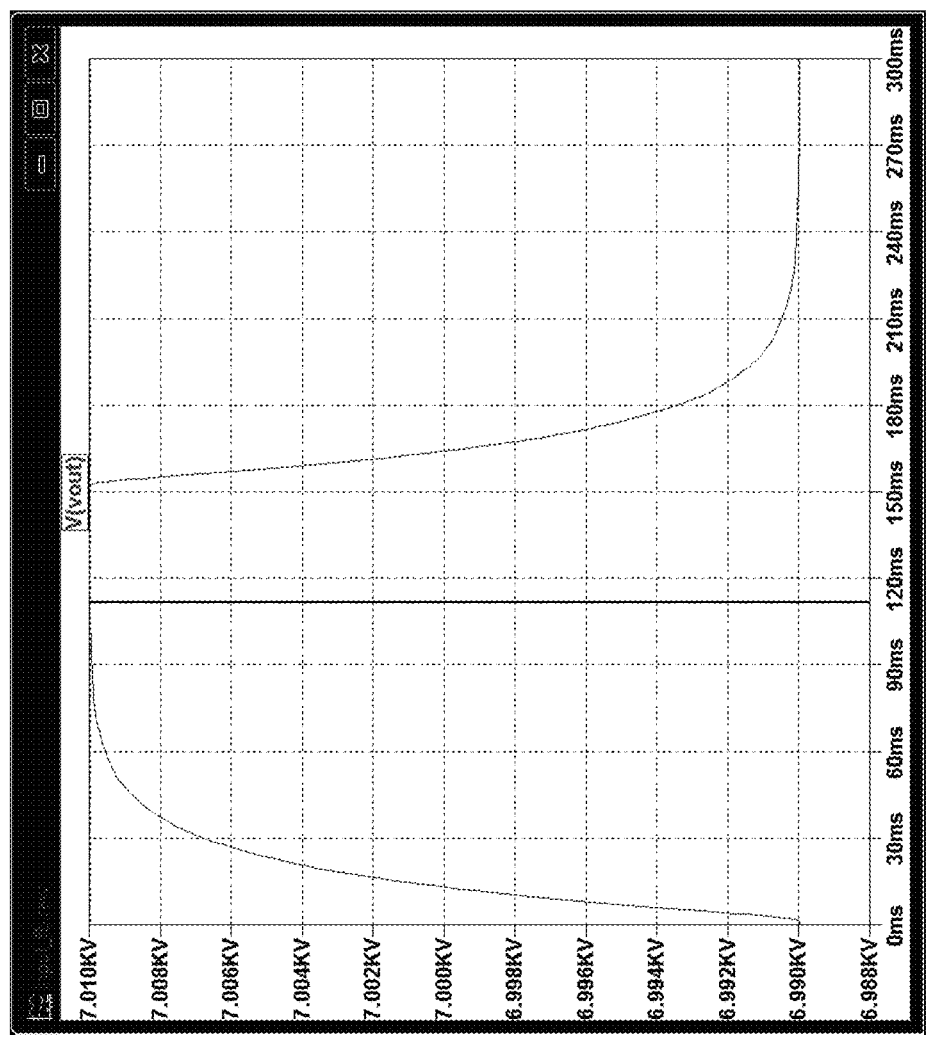
FIGS. 12 and 13 show a comparison of the output response to a 20 V set point step from 6990 V to 7010 V (cursor at 7009.977 V)
Figure 13:
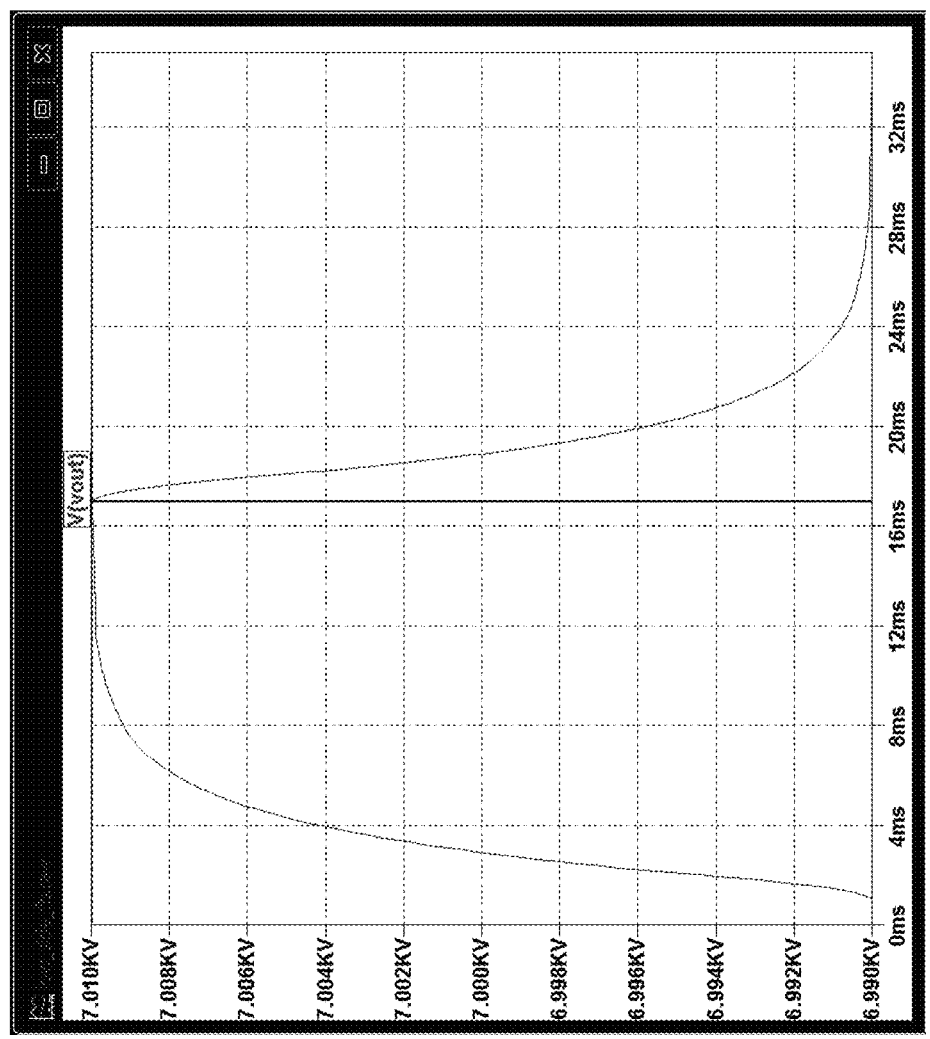

FIGS. 12 and 13 show a comparison of the output response to a 20 V set point step from 6990 V to 7010 V (cursor at 7009.977 V to indicate settling time to within about 3 ppm of the final value). FIG. 12 corresponds to the prior art simulation circuit of FIG. 4, and FIG. 13 corresponds to the simulation circuit of FIG. 5, which uses the feedback through the return side of the output in the manner of FIGS. 2 and 3. As can be seen from FIGS. 12 and 13, the arrangement using the feedback through the return side of the output in the manner of FIGS. 2 and 3 is about six times faster than the prior art. The faster response facilitated by the return side feedback connection also allows broadband waveforms of small amplitude to be superimposed on precisely controlled high DC voltages. Large voltage changes, such as polarity switches, are also enhanced by the return-side feedback circuit, which can improve settling accuracy from 1000 ppm at the HV converter output to just a few ppm with less than 20 ms additional elapsed time.

Figure 14:
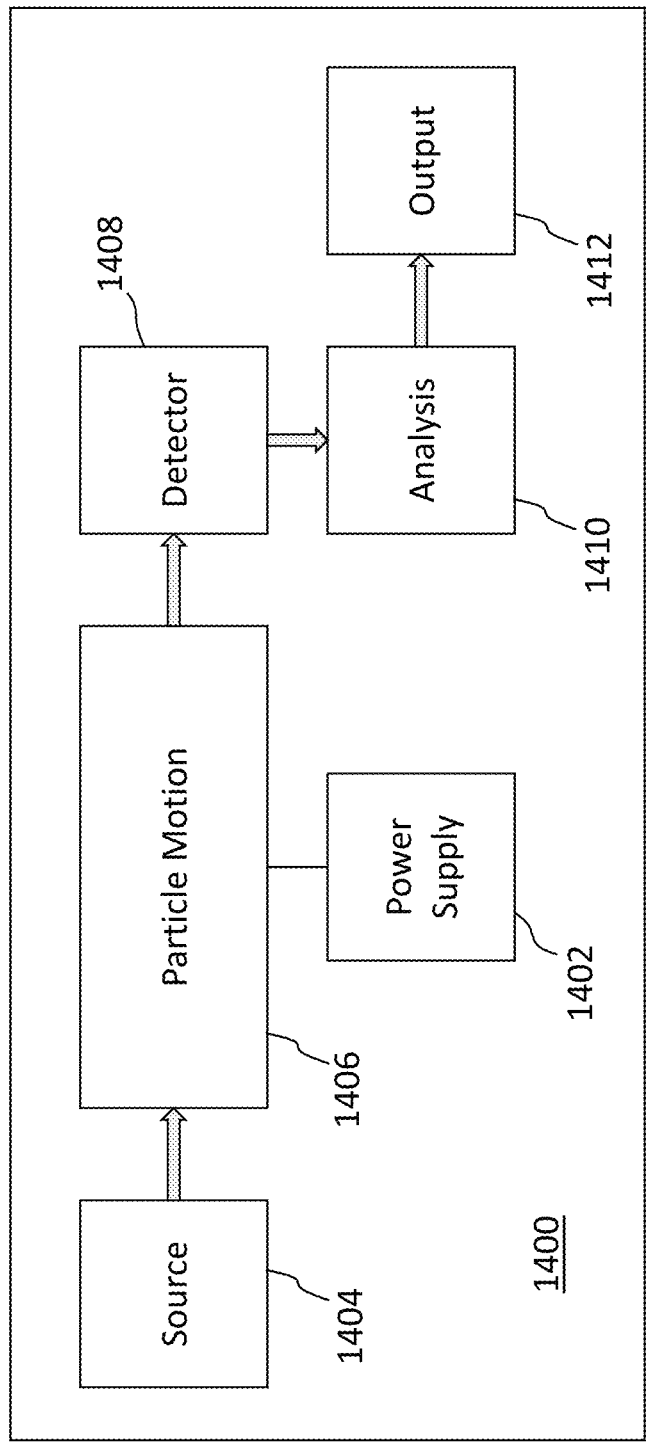
FIG. 14 is a block diagram showing the use of a high voltage power supply in accordance with certain embodiments.

FIG. 14 is a block diagram showing the use of a high voltage power supply in accordance with certain embodiments. An instrument 1400 uses a high voltage power supply 1402 to induce motion of charged particles emitted from a source 1404 in a container or other chamber or other means 1406 for focusing or controlling the moving particles. The high voltage power supply 1402 may be as described above, such as in connection with FIG. 2 or 3. The particles may be ions, electrons, and so on. A detector 1408 senses an outcome due to the motion, and an analysis unit 1410 analyzes the detected outcome for presentation by an output device 1412. The instrument 1400 may be a time-of-flight (TOF) mass spectrometer (MS), or an electron microscope, or any application that requires a tightly controlled output DC voltage from the power supply 1402.

EXEMPLARY EMBODIMENTS

In addition to the embodiments described elsewhere in this disclosure, exemplary embodiments of the present invention include, without being limited to, the following:

1. A high voltage power supply comprising:
   a DC voltage input;
   a converter for converting a DC voltage at the DC voltage input to an AC voltage;
   a booster for boosting the AC voltage to a boosted AC voltage;
   a rectifier in DC isolation from the DC voltage input, the rectifier operable to convert the boosted AC voltage to a high DC voltage at an isolated rectifier output;
   a high voltage DC output for outputting the high DC voltage;
   a voltage control input; and
   an error circuit coupled to the voltage control input and operable to reduce variation in the high DC voltage by driving a return side of the isolated rectifier output in response to feedback based on the high DC voltage.

2. The high voltage power supply of embodiment 1, wherein the error circuit is operable to reduce the variation in the high DC voltage to less than about 10 ppm.

3. The high voltage power supply of embodiment 1 or 2, further comprising:
   a coarse voltage input,
   wherein the converter converts the DC voltage at the DC voltage input to an AC voltage based on a signal at the coarse voltage input.

4. The high voltage power supply of embodiment 3, further including an integrator coupled to an output of the error circuit and to the coarse voltage input for maintaining an output of the error circuit within a prescribed range of a desired setting.

5. The high voltage power supply of embodiment 4, wherein the prescribed range is about +/−10V.

6. The high voltage power supply of any of embodiments 1 through 5, further comprising:
   a voltage divider for providing a portion of the high DC voltage as input to the error circuit, the voltage divider having a first resistor connected to the high voltage DC output and a second resistor connected in series with the first resistor; and
   a first capacitor connected in parallel with the first resistor and a second capacitor connected in parallel with the second resistor,
   wherein the capacitance ratio of the second capacitor to the first capacitor is substantially equal to the resistance ratio of the first resistor to the second resistor.

7. The high voltage power supply of any of embodiments 1 through 5, further comprising:
   a voltage divider for providing a portion of the high DC voltage as input to the error circuit, the voltage divider having a first resistor connected to the high voltage DC output and a second resistor connected in series with the first resistor; and a first capacitor connected in parallel with the first resistor and a second capacitor connected in parallel with the second resistor, wherein a time constant of the first resistor with the first capacitor is greater than a time constant of the second resistor with the second capacitor.

8. The high voltage power supply of any of embodiments 1-7, further comprising a filter for filtering the high DC voltage at the isolated rectifier output voltage.

9. A method comprising:

converting a DC voltage at a DC voltage input to an AC voltage;

boosting the AC voltage to a boosted AC voltage;

using a rectifier to convert the boosted AC voltage to a high DC voltage for output at an isolated rectifier output;

receiving a voltage control input;

reducing variation in the high DC voltage by driving a return side of the isolated rectifier output in response to feedback based on the high DC voltage.

10. The method of embodiment 9, wherein the variation reduction is to less than about 10 ppm.

11. The method of embodiments 9 or 10, further comprising:

receiving a coarse voltage input, wherein said converting comprises converting the DC voltage at the DC voltage input to an AC voltage based on a signal at the coarse voltage input.

12. The method of any of embodiments 9 through 11, wherein said driving is performed by an error circuit coupled to the isolated rectifier output, said method further comprising:

maintaining an output of the converter within a prescribed range of a desired setting by integrating an output of the error circuit.

13. The method of any of embodiments 9 through 12, wherein the prescribed range is about +/−10V.

14. The method of any of embodiments 9 through 13, wherein said driving is performed by an error circuit coupled to the isolated rectifier output, said method further comprising:

using a a voltage divider to provide a portion of the high DC voltage as input to the error circuit, the voltage divider having a first resistor connected to the high voltage DC output and a second resistor connected in series with the first resistor; and providing a first capacitor connected to the high voltage DC output and a second capacitor connected in series with the first capacitor, wherein the capacitance ratio of the second capacitor to the first capacitor is substantially equal to the resistance ratio of the first resistor to the second resistor.

15. The method of any of embodiments 9 through 13, wherein said driving is performed by an error circuit coupled to the isolated rectifier output, said method further comprising:

using a a voltage divider to provide a portion of the high DC voltage as input to the error circuit, the voltage divider having a first resistor connected to the high voltage DC output and a second resistor connected in series with the first resistor; and providing a first capacitor connected to the high voltage DC output and a second capacitor connected in series with the first capacitor, wherein a time constant of the first resistor with the first capacitor is greater than a time constant of the second resistor with the second capacitor.

16. The method of any of embodiments 9 through 15, further comprising;

filtering the high DC voltage at the isolated rectifier output.

17. An instrument comprising:

a source;

a chamber;

a high voltage power supply operable to induce motion of charged particles emitted from the source in the chamber;

a detector operable to sense an outcome due to the motion of the particles, wherein the high voltage power supply includes:

a DC voltage input;

a converter for converting a DC voltage at the DC voltage input to an AC voltage;

a booster for boosting the AC voltage to a boosted AC voltage;

a rectifier in DC isolation from the DC voltage input, the rectifier operable to convert the boosted AC voltage to a high DC voltage at an isolated rectifier output;

a high voltage DC output for outputting the high DC voltage;

a voltage control input; and an error circuit coupled to the voltage control input and operable to reduce variation in the high DC voltage by driving a return side of the isolated rectifier output in response to feedback based on the high DC voltage.

18. The instrument of embodiment 17, wherein the error circuit is operable to reduce the variation in the high DC voltage to less than about 10 ppm.

19. The instrument of embodiments 17 or 18, further comprising:

a coarse voltage input, wherein the converter converts the DC voltage at the DC voltage input to an AC voltage based on a signal at the coarse voltage input.

20. The instrument of embodiment 19, further including an integrator coupled to an output of the error circuit and to the coarse voltage input for maintaining an output of the converter within a prescribed range of a desired setting.

21. The instrument of embodiment 20, wherein the prescribed range is about +/−10V.

22. The instrument of embodiments 17 through 21, further comprising:

a voltage divider for providing a portion of the high DC voltage as input to the error circuit, the voltage divider having a first resistor connected to the high voltage DC output and a second resistor connected in series with the first resistor; and a first capacitor connected to the high voltage DC output and a second capacitor connected in series with the first capacitor, wherein the capacitance ratio of the second capacitor to the first capacitor is substantially equal to the resistance ratio of the first resistor to the second resistor.

23. The instrument of embodiments 17 through 21, further comprising:

a voltage divider for providing a portion of the high DC voltage as input to the error circuit, the voltage divider having a first resistor connected to the high voltage DC output and a second resistor connected in series with the first resistor; and a first capacitor connected to the high voltage DC output and a second capacitor connected in series with the first capacitor, wherein a time constant of the first resistor with the first capacitor is greater than a time constant of the second resistor with the second capacitor.

24. The instrument of embodiments 17 through 23, further comprising a filter for filtering the high DC voltage at the isolated rectifier output.

25. The instrument of embodiments 17 through 24, wherein said instrument is a time-of-flight (TOF) mass spectrometer (MS).

26. The instrument of embodiments 17 through 24, wherein said instrument is an electron microscope.

27. The high voltage power supply of embodiment 1, further including polarity circuit for changing the output high voltage polarity between positive and negative.

28. The method of embodiment 9, further including providing a polarity circuit for changing the output high voltage polarity between positive and negative.

29. The instrument of embodiment 17, further including polarity circuit for changing the output high voltage polarity between positive and negative.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted based on the foregoing description.

What is claimed is:

1. A high voltage power supply comprising:
    a DC voltage input;
    a converter for converting a DC voltage at the DC voltage input to an AC voltage;
    a booster for boosting the AC voltage to a boosted AC voltage;
    a rectifier in DC isolation from the DC voltage input, the rectifier operable to convert the boosted AC voltage to a high DC voltage at an isolated rectifier output;
    a high voltage DC output for outputting the high DC voltage;
    a voltage control input; and
    an error circuit coupled to the voltage control input and operable to reduce variation in the high DC voltage by driving a return side of the isolated rectifier output in response to feedback based on the high DC voltage.

2. The high voltage power supply of claim 1, wherein the error circuit is operable to reduce the variation in the high DC voltage to less than about 10 ppm.

3. The high voltage power supply of claim 1, further comprising:
    a coarse voltage input,
    wherein the converter converts the DC voltage at the DC voltage input to an AC voltage based on a signal at the coarse voltage input.

4. The high voltage power supply of claim 3, further including an integrator coupled to an output of the error circuit and to the coarse voltage input for maintaining an output of the error circuit within a prescribed range of a desired setting.

5. The high voltage power supply of claim 4, wherein the prescribed range is about +/−10V.

6. The high voltage power supply of claim 1, further comprising:
    a voltage divider for providing a portion of the high DC voltage as input to the error circuit, the voltage divider having a first resistor connected to the high voltage DC output and a second resistor connected in series with the first resistor; and
    a first capacitor connected in parallel with the first resistor and a second capacitor connected in parallel with the second resistor,
    wherein the capacitance ratio of the second capacitor to the first capacitor is substantially equal to the resistance ratio of the first resistor to the second resistor.

7. The high voltage power supply of claim 1, further comprising:
    a voltage divider for providing a portion of the high DC voltage as input to the error circuit, the voltage divider having a first resistor connected to the high voltage DC output and a second resistor connected in series with the first resistor; and
    a first capacitor connected in parallel with the first resistor and a second capacitor connected in parallel with the second resistor,
    wherein a time constant of the first resistor with the first capacitor is greater than a time constant of the second resistor with the second capacitor.

8. The high voltage power supply of claim 1, further comprising a filter for filtering the isolated rectifier output voltage.

9. The high voltage power supply of claim 1, further including a polarity circuit for changing the output high voltage polarity between positive and negative.

10. An instrument including the high voltage power supply of claim 1, the instrument further comprising:
    a source;
    a chamber; and
    a detector,
    wherein the high voltage power supply is operable to induce motion of charged particles emitted from the source in the chamber, and wherein the detector is operable to sense an outcome due to the motion of the particles.

11. The instrument of claim 10, wherein said instrument is a time-of-flight (TOF) mass spectrometer (MS).

12. A method comprising:
    converting a DC voltage at a DC voltage input to an AC voltage;
    boosting the AC voltage to a boosted AC voltage;
    using a rectifier to convert the boosted AC voltage to a high DC voltage for output at an isolated rectifier output;
    receiving a voltage control input;
    reducing variation in the high DC voltage by driving a return side of the isolated rectifier output in response to feedback based on the high DC voltage.

13. The method of claim 12, wherein the variation reduction is to less than about 10 ppm.

14. The method of claim 12, further comprising:
    receiving a coarse voltage input,
    wherein said converting comprises converting the DC voltage at the DC voltage input to an AC voltage based on a signal at the coarse voltage input.

15. The method of claim 14, wherein said driving is performed by an error circuit coupled to the isolated rectifier output, said method further comprising:

maintaining an output of the converter within a prescribed range of a desired setting by integrating an output of the error circuit.

16. The method of claim 15, wherein the prescribed range is about +/−10V.

17. The method of claim 12, wherein said driving is performed by an error circuit coupled to the isolated rectifier output, said method further comprising:
using a a voltage divider to provide a portion of the high DC voltage as input to the error circuit, the voltage divider having a first resistor connected to the high voltage DC output and a second resistor connected in series with the first resistor; and
providing a first capacitor connected in parallel with the first resistor and a second capacitor connected in parallel with the second resistor,
wherein the capacitance ratio of the second capacitor to the first capacitor is substantially equal to the resistance ratio of the first resistor to the second resistor.

18. The method of claim 12, wherein said driving is performed by an error circuit coupled to the isolated rectifier output, said method further comprising:
using a a voltage divider to provide a portion of the high DC voltage as input to the error circuit, the voltage divider having a first resistor connected to the high voltage DC output and a second resistor connected in series with the first resistor; and
providing a first capacitor connected in parallel with the first resistor and a second capacitor connected in parallel with the second resistor,
wherein a time constant of the first resistor with the first capacitor is greater than a time constant of the second resistor with the second capacitor.

19. The method of claim 12, further comprising;
filtering the isolated rectifier output voltage.

20. The method of claim 12, further including providing a polarity circuit for changing the output high voltage polarity between positive and negative.

* * * * *